US009200796B2

(12) United States Patent
Ehrmann et al.

(10) Patent No.: US 9,200,796 B2
(45) Date of Patent: Dec. 1, 2015

(54) INDIVIDUAL LIGHTING DEVICE FOR A VEHICLE SEAT

(71) Applicant: PRECILEC, Auxerre (FR)

(72) Inventors: Charles Ehrmann, Issoudun (FR); Philippe Roy, Diou (FR); Pascal Gordiet, Saint Georges sur la Pree (FR)

(73) Assignee: PRECILEC, Auxerre (FR)

( * ) Notice: Subject to any disclaimer, the term of this patent is extended or adjusted under 35 U.S.C. 154(b) by 246 days.

(21) Appl. No.: 13/923,074

(22) Filed: Jun. 20, 2013

(65) Prior Publication Data

US 2013/0343072 A1 Dec. 26, 2013

(30) Foreign Application Priority Data

Jun. 21, 2012 (FR) .................................... 12 55866

(51) Int. Cl.
*F21V 33/00* (2006.01)
*B60Q 3/02* (2006.01)
*B64D 11/06* (2006.01)
*B64D 11/00* (2006.01)

(52) U.S. Cl.
CPC .............. *F21V 33/00* (2013.01); *B60Q 3/0253* (2013.01); *B64D 11/06* (2013.01); *B64D 11/0636* (2014.12); *B64D 11/0638* (2014.12); *B64D 2011/0053* (2013.01)

(58) Field of Classification Search
CPC  F21V 33/06; B64D 11/06; B64D 2011/0053; B60Q 3/0253
USPC .......................................... 362/471, 483, 543
See application file for complete search history.

(56) References Cited

U.S. PATENT DOCUMENTS

| 2,421,680 | A | 6/1947 | Candlin et al. |
| 7,661,848 | B2 | 2/2010 | Gunnewig et al. |
| 8,348,455 | B2 | 1/2013 | Kessler |
| 2006/0261970 | A1 | 11/2006 | Colacecchi |
| 2007/0035955 | A1 | 2/2007 | Puschmann |
| 2011/0235350 | A1* | 9/2011 | Kessler ......................... 362/471 |

FOREIGN PATENT DOCUMENTS

| DE | 10 2006 048711 | 4/2008 |
| DE | 10 2008 055812 | 5/2010 |

OTHER PUBLICATIONS

French Search report dated Mar. 6, 2013 in corresponding French application.

* cited by examiner

*Primary Examiner* — David V Bruce
(74) *Attorney, Agent, or Firm* — Young & Thompson

(57) ABSTRACT

The invention relates to an individual lighting device (20) for a vehicle seat including: a plurality of light sources (S1, S2, S3) having an adjustable light intensity and each emitting in a favored direction (D1, D2, D3), at least two sources being arranged so that the directions (D1, D2, D3) of those two sources are not parallel.

20 Claims, 1 Drawing Sheet

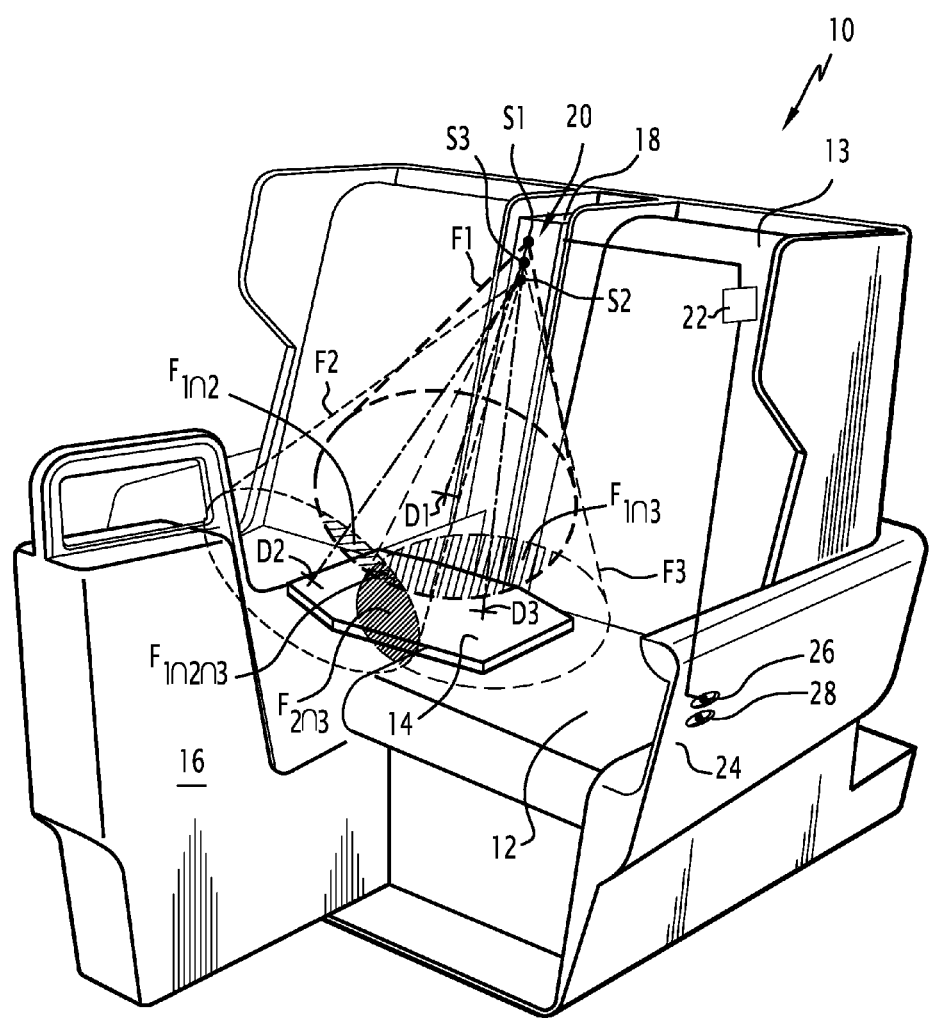

INDIVIDUAL LIGHTING DEVICE FOR A VEHICLE SEAT

The present invention relates to an individual lighting device for a vehicle seat. The present invention also relates to a seat including the device. The invention in particular relates to the field of civil aeronautics and in particular relates to an airplane comprising the seat.

In first class, the seats of civilian airplanes allow passengers to benefit from individual light devices. A device generally comprises one or more light sources, the direction of which can be adjusted. Thus, the position of the area lighted by the light produced by the device can be modified to meet the different needs of the passenger. Reading is one of these needs. As a result, the light sources are sometimes referred to as reading lights.

It is known that the direction of the light source is adjusted using a mechanism making it possible to rotate and/or translate the light source. The mechanism is usually actuated manually by the passenger.

However, this mechanism must be able to bear the stresses of civil aviation, in particular in terms of reliability. This is made even more difficult by the fact that the mechanism is manipulated by a large number of passengers, which involves still further increasing the robustness of the mechanism. This causes significant costs. Furthermore, the mechanism is often bulky.

Thus, there is a need for an individual lighting device for a vehicle seat that is more robust.

According to the invention, this aim is achieved by an individual lighting device for a vehicle seat comprising a plurality of light sources having an adjustable light intensity and each emitting in a favored direction, at least two sources being arranged so that the directions of those two sources are not parallel.

According to other specific embodiments, the lighting device comprises one or more of the following features, considered alone or according to any technically possible combinations:
  the plurality of light sources is arranged so that, for each source, the favored direction is not parallel to the directions of the other sources.
  each source of the plurality of light sources is adapted to emit a light beam, at least two sources being arranged so that the beams emitted by the two sources have an area of intersection.
  the plurality of light sources is arranged so that, for each source, the emitted light beam has at least one area of intersection with the light beams emitted by the other sources.
  a controller capable of varying the light intensity of each light source independently.
  the controller is capable of varying the light intensity of each light source continuously.
  the controller is capable of varying the light intensity of each source discreetly.
  the controller includes a passenger interface, the interface being capable of receiving commands from the passenger and transmitting them to the controller.
  the controller includes two operating modes: automatic mode, in which the interface is capable of receiving commands to light an area and the controller is capable of adjusting the light intensity of each light source as a function of the received commands, and manual mode, in which the interface is capable of receiving commands to change the light intensity of each light source and the controller is capable of adjusting the light intensity of each light source as a function of the received commands.

The invention also relates to a vehicle seat including the device previously described.

Furthermore, the invention also relates to an airplane including at least one seat as previously described.

Other features and advantages of the invention will appear upon reading the following detailed description of embodiments of the invention, provided solely as an example and in reference to the drawing, in which FIG. 1 is a perspective view of an airplane seat equipped with an individual lighting device according to the invention.

In the example proposed according to FIG. 1, an airplane seat 10 is shown. Nevertheless, it is understood that the invention applies to any type of vehicle seat.

The seat 10 includes a seating portion 12 for a passenger and a backrest 13, the seating portion 12 and the backrest 13 ensuring that the passenger is comfortably settled during the journey.

The seat 10 also comprises a retractable table 14 in particular serving to bear meal trays. The seat 10 also comprises other equipment 16 not described, such as storage space.

The seat 10 is provided with a console 18 separating the seat from the other equipment 16. According to the example of FIG. 1, the console 18 is a lateral strip parallel to the backrest. The console 18 is equipped with an individual lighting device 20. The device 20 is thus capable of lighting the passengers surroundings, and in particular the table 14.

According to another embodiment, the device 20 is positioned in another location of the passenger's surroundings, such as the ceiling or a baggage compartment, for example.

The device 20 includes three light sources capable of emitting a beam of light: the first source S1, the second source S2 and the third source S3. As an example, the three sources S1, S2 and S3 of FIG. 1 are identical.

According to one embodiment, the light sources S1, S2 and S3 are light-emitting diodes. Such sources have the advantage of offering a small bulk while allowing sufficient lighting of the area with a relatively low supply of current.

Each source S1, S2 and S3 emits in a favored direction. Thus, the first source emits in a first direction D1, the second source in a second direction D2 and the third source in a third direction D3.

The favored direction D of the source S is the direction in which the light intensity is greatest.

When the source S produces a symmetrical beam of light, the favored direction D corresponds to the direction situated at the center of the beam of light emitted by the source S. Thus, the beam of light emitted by each of the sources S1, S2 and S3 lights a symmetrical volume shown diagrammatically in the form of a column in FIG. 1. A first cone corresponds to the beam F1 emitted by the source S1, a second cone corresponds to the beam F2 emitted by the source S2, and a third cone corresponds to the beam F3 emitted by the source S3. In that case, the height of the considered cone constitutes the favored direction for the considered source.

According to the example of FIG. 1, the sources S1, S2 and S3 are arranged so that for each source, the favored direction is not parallel to the favored directions of the other sources. More specifically, this means that the first direction D1 is not parallel to the second direction D2, the second direction D2 is not parallel to the third direction D3, and the third direction D3 is not parallel to the first direction D1.

In the configuration of FIG. 1, the three light sources S1, S2 and S3 are also arranged so that, for each source, the emitted light beam has at least one area of intersection with the light beams emitted by the other sources. Thus, the first beam F1 and the second beam F2 have an area of intersection $F_{1\cap 2}$; the second beam F2 and the third beam F3 have an area of intersection $F_{2\cap 3}$; and the third beam F3 and the first beam F1 have an area of intersection $F_{3\cap 1}$.

Furthermore, for the case of FIG. 1, the areas of intersection $F_{1\cap 2}$, $F_{2\cap 3}$ and $F_{3\cap 1}$ have a non-zero intersection in space. This intersection, denoted $F_{1\cap 2\cap 3}$, corresponds to an area of the space that is lit by all three beams F1, F2 and F3 at once.

Furthermore, the light intensity of the three sources S1, S2 and S3 is adjustable. Preferably, the light intensity is adjustable independently for each source S1, S2 and S3.

According to the example of FIG. 1, the light intensity of the three sources is controlled by a controller 22. The controller 22 is, according to this embodiment, a dedicated electronic unit coupled to a computer.

According to one embodiment, the controller 22 is capable of varying the light intensity of each light source S1, S2 and S3 independently. This means that the controller 22 exerts individualized control on the light intensity of each light source S1, S2 and S3.

According to one embodiment, the controller 22 is capable of varying the light intensity of each light source S1, S2 and S3 discreetly, between at least three values. Thus, for example, for the light source S1, all three values have a maximal light intensity value $V_{max}$, a minimal light intensity value $V_{min}$ (source S1 not lit as an illustration), and an intermediate light intensity value $V_{int}$ comprised between 10% of the maximal light intensity value $V_{max}$ and 90% of the maximal light intensity value $V_{max}$.

In the case of FIG. 1, the controller 22 is capable of varying the light intensity of each light source S1, S2 and S3 continuously between a minimal light intensity value $V_{min}$ and a maximal light intensity value $V_{max}$ of each source. As an example, depending on the embodiment, $V_{min}$ is zero or corresponds to 10% of the maximal light intensity value; $V_{max}$ is the maximal value of the light intensity that can be delivered by the considered source or corresponds to 10% of the maximum light intensity value.

In the case of FIG. 1, the controller 22 includes a passenger interface 24. This interface 24 assumes the form of a keypad.

The interface 24 is capable of receiving commands from the passenger and transmitting them to the controller 22. This interface 24 serves as the control interface so that the passenger can control the direction of the beam of the device 20.

During operation, the controller 22 of FIG. 1 includes two operating modes: an automatic mode and a manual mode.

In the manual mode, the passenger enters commands into the interface to modify the light intensity of each light source S1, S2 and S3. In this case, the controller 22 carries out the modification commands entered by the passenger.

In the automatic mode, the passenger enters commands into the interface 24 to light one particular area as needed. In the case of FIG. 1, the interface 24 has two buttons 26 and 28, a button 26 dedicated to controlling the beam of the device 20 in one direction and a button 28 dedicated to controlling the beam of the device 20 in the perpendicular direction. This makes it possible to orient the beam of the device 20 as desired by the passenger.

Based on the received commands, the computer calculates the light intensity of each light source S1, S2 and S3 that is best suited to the situation. The controller 22 then imposes the best-suited light intensity on each light source S1, S2 and S3. This results in a beam oriented in accordance with the passengers wishes.

In the case of FIG. 1, the chosen configuration makes it possible to light the table 14 so that the passenger can eat.

Thus, the area lighted by the lighting device 20 changes without using a positioning mechanism for the sources S1, S2 and S3. The sources S1, S2 and S3 are stationary and only the light intensity of those sources S1, S2 and S3 varies. This makes the device 20 more robust while guaranteeing good passenger comfort.

The invention claimed is:

1. An individual lighting device for a vehicle seat comprising:
    a plurality of light sources, each having a light intensity that is adjustable among at least three values and each emitting in a favored direction,
    at least two of the plurality of light sources being arranged so that the directions of the at least two light sources are not parallel.

2. The device according to claim 1, wherein the plurality of light sources is arranged so that, for each of said light sources, the favored direction is not parallel to the directions of the other of said light sources.

3. The device according to claim 1, wherein each of the plurality of light sources is adapted to emit a light beam, at least two of said light sources being arranged so that the beams emitted by the at least two of said light sources have an area of intersection.

4. The device according to claim 2, wherein each of the plurality of light sources is adapted to emit a light beam, at least two of said light sources being arranged so that the beams emitted by the at least two of said light sources have an area of intersection.

5. The device according to claim 3, wherein the plurality of light sources is arranged so that, for each of said light sources, the emitted light beam has at least one area of intersection with the light beams emitted by the other of said light sources.

6. The device according to claim 4, wherein the plurality of light sources is arranged so that, for each of said light sources, the emitted light beam has at least one area of intersection with the light beams emitted by the other of said light sources.

7. The device according to claim 1, further including:
    a controller capable of varying the light intensity of each of said light sources independently.

8. The device according to claim 2, further including:
    a controller capable of varying the light intensity of each of said light sources independently.

9. The device according to claim 3, further including:
    a controller capable of varying the light intensity of each of said light sources independently.

10. The device according to claim 4, further including:
    a controller capable of varying the light intensity of each of said light sources independently.

11. The device according to claim 7, wherein the controller is capable of varying the light intensity of each of said light sources continuously or discreetly.

12. The device according to claim 8, wherein the controller is capable of varying the light intensity of each of said light sources continuously or discreetly.

13. The device according to claim 11, wherein the controller includes a passenger interface, the interface being capable of receiving commands from the passenger and transmitting them to the controller.

14. The device according to claim 12, wherein the controller includes a passenger interface, the interface being capable of receiving commands from the passenger and transmitting them to the controller.

15. The device according to claim 13, wherein the controller includes two operating modes: namely, an automatic mode, in which the interface is capable of receiving commands to light an area and the controller is capable of adjusting the light intensity of each of said light sources as a function of the received commands, and a manual mode, in which the interface is capable of receiving commands to change the light intensity of each of said light sources and the controller is capable of adjusting the light intensity of each of said light sources as a function of the received commands.

16. The device according to claim 14, wherein the controller includes two operating modes: namely, an automatic mode, in which the interface is capable of receiving commands to light an area and the controller is capable of adjusting the light intensity of each of said light sources as a function of the received commands, and a manual mode, in which the interface is capable of receiving commands to change the light intensity of each of said light sources and the controller is capable of adjusting the light intensity of each of said light sources as a function of the received commands.

17. A vehicle seat including the device according to claim 1.

18. An airplane including at least one seat according to claim 17.

19. An individual lighting device for a vehicle seat comprising:

three separate light sources attached to a vehicle seat, each of the three light sources emitting in a favored direction that is not parallel to the favored direction of any other of the three light sources; and a controller that varies light intensity of each of the three light sources separately and among at least three intensities including a minimum intensity, a maximum intensity, and an intermediate intensity between the minimum and maximum intensity, wherein the three light sources are arranged so that a first area of the seat receives light emitted from all three of the light sources, so that a second area of the seat receives light emitted from only two of the three light sources, and so that a third area of the seat receives light emitted from only one of the three light sources.

20. The device according to claim 19, wherein the controller varies the light intensity continuously from the minimum to the maximum intensity.

* * * * *